June 13, 1961 R. J. NEFF 2,988,384
TOWING DEVICE OF THE BUMPER ATTACHED FLEXIBLE LINE TYPE
Filed April 7, 1959
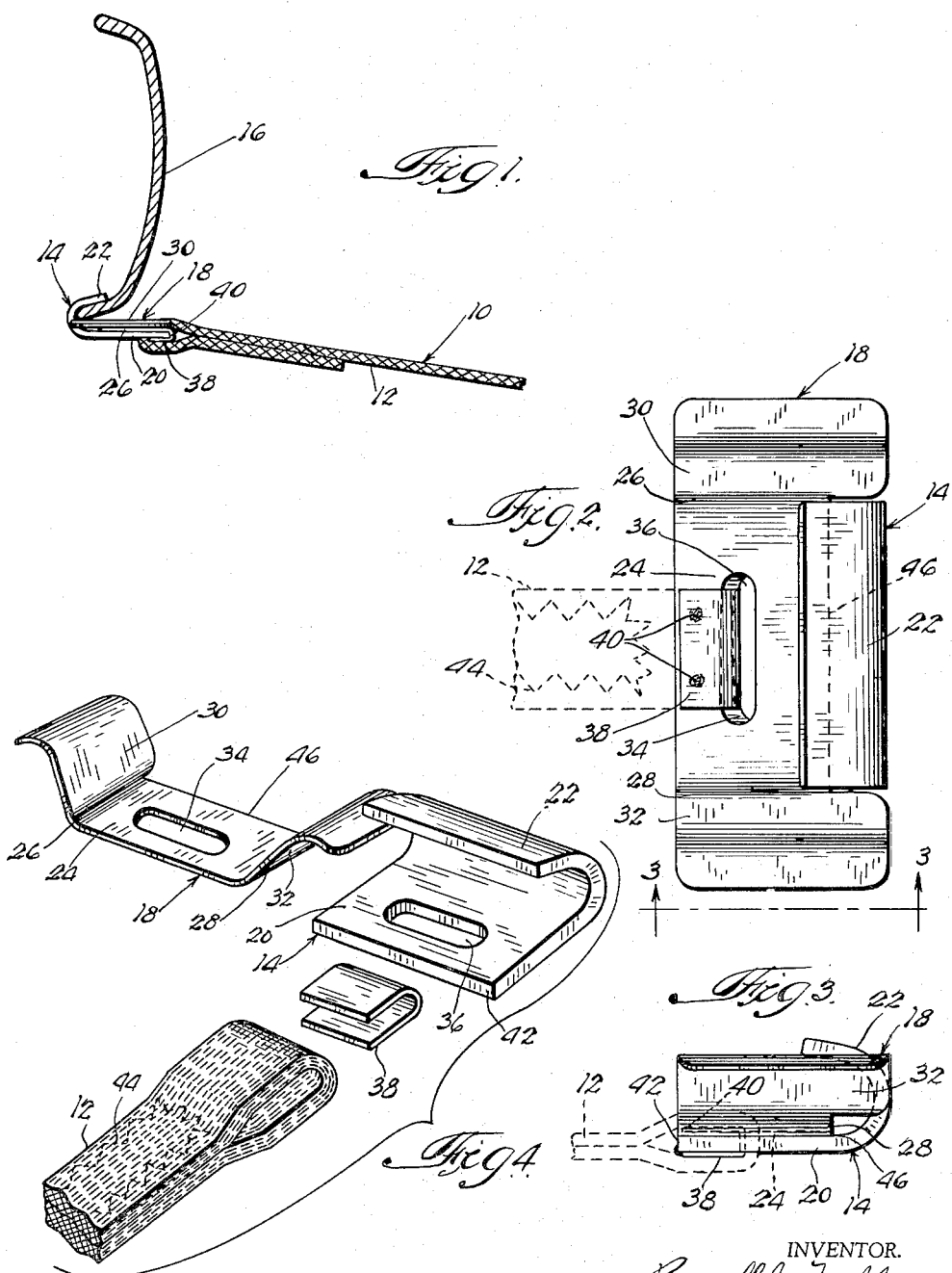
INVENTOR.
Russell J. Neff.

2,988,384
TOWING DEVICE OF THE BUMPER ATTACHED FLEXIBLE LINE TYPE

Russell J. Neff, Park Ridge, Ill., assignor to Phoenix Trimming Company, Chicago, Ill., a corporation of Illinois Filed Apr. 7, 1959, Ser. No. 804,762
6 Claims. (Cl. 280—480)

This invention relates to a towing device of the attached flexible line type and more particularly to an improved clamp for holding the device to a bumper of a vehicle or the like.

In United States Letters Patent No. 2,801,114, several earlier difficulties were overcome, namely, the excessive time, additional tools or equipment and patience required for devices which were hard to engage. Other devices, being easy to affix, tended to slip off the bumper if tension transmitted through the flexible line were relaxed. Even with the invention in the above Letters Patent, however, it has been found that the rigid clamp member disclosed therein frequently sticks on the bumper and that once engaged the resilient clamp member tends to block withdrawal from the vehicle bumper, difficulties which have become apparent when such a towing device is used with automatic automobile washing machines in which minimum weight and maximum ease and speed for engagement and disengagement are essential.

It is therefore an object of the present invention to provide an improved construction in which disengagement is facilitated without an increase in the likelihood of the clamp being disengaged during use, whether there be slack in the flexible line or not.

Another object of the invention is to provide an improved vehicle bumper clamp construction in which the bumper is grasped by a hook positioned between two wings which are opposed to the bumper outside the grasping tip portion of the hook.

A further object of the invention is to provide an improved towing device which is of simple, relatively inexpensive construction and which may be readily removed from or attached to a vehicle bumper without additional tools or equipment.

Accordingly, in one embodiment of this invention the improved towing device includes a flexible towing line and a clamp secured to at least one end thereof adapted to embrace a lateral edge of a vehicle bumper, the clamp comprising a hook having a shank portion and a tip portion, a wing member extending beside the tip portion of the hook, resilient means positioned on the shank portion of the hook and connected to the wing member for biasing the wing member upon the shank portion, and a flange on the distal end of the wing member.

This invention together with further objects and advantages will be best understood by reference to the following description taken in connection with the accompanying drawings, in which:

FIGURE 1 is a side elevational view of the invention in operational engagement with a vehicle bumper shown in section;

FIG. 2 is a plan view of certain elements of the invention shown in FIG. 1;

FIG. 3 is a side elevational view taken substantially in the direction of arrows 3—3 in FIG. 2; and FIG. 4 is an exploded view in perspective of the elements of the invention shown in FIGS. 1, 2 and 3.

Referring more particularly to the drawings, towing device 10 comprises a flexible line 12 secured to hook 14 which engages vehicle bumper 16. Spring member 18, attached to shank portion 20 of hook 14 includes a pair of wing members which bear against bumper 16 alongside the tip portion 22 of hook 14. The tip portion 22, including the bottom curved portion, of hook 14 may be so formed as to accommodate most bumpers' surface configurations. Hook 14 having sufficient tensile strength to withstand contemplated towing stresses is preferably made with a wide shank portion 20 and a correspondingly wide tip portion 22 in order to prevent pressure being concentrated upon a particular point in bumper 16 as tension is increased in or maintained upon the flexible line 12.

In the preferred embodiment, a resilient plate central portion 24 of spring 18 is affixed on the inner surface of shank portion 20 of hook 14. Elastic hinge portions 26 and 28 of spring 18 integrally connect wing members 30 and 32 to the central portion 24, and an arcuate shaped flange is formed in the distal end of wing 30, another arcuate shaped flange being formed in the distal end of wing 32. The flanges may be substantially parallel and extend beyond the same edge of central portion 24 of spring 18, outside opposite edges of the tip portion 22 of hook 14.

Slot 34 is located in the central portion 24 of spring 18 and substantially coincides with slot 36 in shank portion 20 of hook 14 so that clip 38 may be inserted therethrough. Clip 38 and spring 18 are secured to hook 14 adjacent to end 42 of shank portion 20, as by a weld 40, although it is contemplated that any suitably strong means for fastening spring 18 to hook 14 may be used. One end of flexible line 12 may be inserted through slots 34 and 36 around clip 38 and fastened to the body of the line, which may be made of any suitably strong fabric such as nylon, by stitching 44. Again, it is contemplated that any other convenient means may be adopted for securing flexible line 12 to hook 14.

The towing device 10 may be affixed by slipping tip portion 22 of hook 14 around one edge of bumper 16 and by then applying light pressure to position the bottom of hook 14 adjacent to the edge of bumper 16. As the arcuate flanges are engaged by bumper 16, wings 30 and 32 biased upon shank portion 20 of hook 14 are depressed, activating elastic hinges 26 and 28 to exert pressure on bumper 16 outside opposite edges of tip portion 22 of hook 14. Once the towing device 10 is affixed wings 30 and 32 press tip portion 22 of hook 14 securely against the inner surface of bumper 16 whether tension is present on the flexible line 12 or not. The arcuate flanges also facilitate removal by not blocking withdrawal of hook 14 since, when pressure is applied on shank portion 20 toward the bottom of hook 14, the flanges easily slide across bumper 16.

In the preferred form of the invention a spot weld 40, or any other suitable means, may affix an edge of spring 18 adjacent to one end 42 of shank portion 20, thus leaving an opposite edge portion 46 of spring 18 free to flex cooperatively with elastic hinges 26 and 28. Resilient central portion 24 and the elastic hinges 26 and 28 may each contribute to the force of spring 18 to hold hook 14 securely in place on bumper 16.

It will thus be apparent that this invention provides a reliable and economical towing device so constructed as to facilitate engagement and unobstructed disengagement and at the same time to provide against accidental disengagement.

It will be understood, of course, that the invention is not to be limited to the particular embodiment shown and described above, since many modifications may be made. It is contemplated, therefore, by the appended claims to cover any such modifications, as fall within the true spirit and scope of this invention.

What is desired to be claimed is:

1. A towing device for vehicles including a flexible towing line and a clamp secured to at least one end thereof adapted to engage a lateral edge of a vehicle bumper, the clamp comprising a hook having a shank portion and a tip portion, wing members extending outside of opposite sides of the tip portion from the shank portion, resilient means positioned across and affixed to the inner face of the shank portion and integrally connected to the wing members for biasing the wing members against the vehicle bumper to be grasped by the hook when said bumper is inserted between the tip of the hook and the wing members, a clip affixed to the resilient means and the shank portion, and arcuate flanges convex to the inner surface of said tip portion on the distal ends of the wing members.

2. A towing device for vehicles including a flexible towing line and a clamp secured to at least one end thereof adapted to engage a lateral edge of a vehicle bumper, the clamp comprising a hook having a shank portion and a tip portion, wing members extending outside of opposite edges of the tip portion from the shank portion, resilient means positioned across and affixed to the inner face of the shank portion for biasing the wing members against the vehicle bumper to be grasped by the hook when said bumper is inserted between the tip of the hook and the wing members, elastic hinges integrally connecting each wing member to the resilient means, a clip affixed to the resilient means and the shank portion adjacent to one end of the shank portion, and arcuate flanges convex to the inner surface of said tip portion on the distal ends of the wing members.

3. A towing device for vehicles including a flexible towing line and a clamp secured to at least one end thereof adapted to engage a lateral edge of a vehicle bumper, the clamp comprising a hook having wide shank and tip portions, a resilient member secured on the inner surface of the shank facing the tip portion, said resilient member being positioned across the shank and affixed thereto adjacent to one edge of said member along the distal end of the shank, said resilient member also extending from the inner surface of the shank in the direction of the side edges thereof, wing members integrally connected to the resilient member and extending from beside the tip toward the side edges of the shank, and arcuate flanges at outwardly extending end portions of the wing members embracing opposite sides of the tip of the hook, a portion of the resilient member opposite the distal end of the shank and adjacent to the bottom of the hook being flexibly positioned responsive to displacement of at least one of the wing members away from the tip, and the resilient member and the wing members being so constructed and arranged that said wing members are biased against the vehicle bumper to be grasped by the hook when the bumper is inserted between the tip of the hook and the arcuate flanges on the wing members.

4. A towing device for vehicles including a flexible towing line and a clamp secured to at least one end thereof adapted to engage a lateral edge of a vehicle bumper, the clamp comprising a hook having wide shank and tip portions, a resilient member secured on the inner surface of the shank facing the tip portion, said resilient member being positioned across the shank and affixed thereto adjacent to one edge of said member along the distal end of the shank, said resilient member also extending from the inner surface of the shank in the direction of the side edges thereof, wing members integrally connected to the resilient member and extending from beside the tip toward the side edges of the shank, and arcuate flanges at outwardly extending end portions of the wing members embracing opposite sides of the tip of the hook, a portion of the resilient member opposite the distal end of the shank and adjacent to the bottom of the hook being flexibly positioned responsive to displacement of at least one of the wing members away from the tip, the shank being positioned outside of the resilient member and the tip in opposition to movement of the resilient member away from the tip, and the resilient member and the wing members being so constructed and arranged that said wing members are biased against the vehicle bumper to be grasped by the hook when the bumper is inserted between the tip of the hook and the arcuate flanges on the wing members.

5. A clamp for use in towing devices and adapted to engage the edge of a member being towed comprising a hook member having a tip portion, a bight portion and a shank portion extending in the direction of application of force when said clamp is in use, and a spring member having a base portion, at least one wing portion and a flexible hinge portion between said base portion and said wing portion, the base portion of said spring member being attached to the shank of said hook to dispose said hinge portion substantially parallel to said direction of application of force, said hook member being disposed to remain in engagement with one side of such towed member edge and said wing member being disposed to remain in engagement with the other side of such towed member edge when said clamp is in use, and elemental portions of said wing portion and hinge portion which extend perpendicular to said direction of application of force being capable of flexing about said hinge portion, for biasing said tip portion against said one side of said towed member edge when said edge is disposed between said tip member and said wing member.

6. A clamp for use in towing devices and adapted to engage the edge of a member being towed comprising a hook member having a tip portion, a bight portion and a shank portion extending in the direction of application of force when said clamp is in use, and a spring member having a base portion, wing portions of substantial surface area straddling the hook tip and flexible hinge portions between said base portion and said wing portions and extending substantially the full width thereof, the base portion of said spring member being attached to the shank of said hook to dispose said hinge portions substantially parallel to said direction of application of force, said hook member being disposed to remain in engagement with one side of such towed member edge and said wing member being disposed to remain in engagement with the other side of such towed member edge when said clamp is in use, and elemental portions of said wing portions and hinge portions which extend perpendicular to said direction of application of force being capable of flexing about said hinge portions, for biasing said tip portion against said one side of said towed member edge when said edge is disposed between said tip member and said wing member.

References Cited in the file of this patent

UNITED STATES PATENTS

| | | |
|---|---|---|
| D. 34,008 | Powell et al. | Jan. 29, 1901 |
| 103,008 | Blake | May 17, 1870 |
| 510,245 | Dorr | Dec. 5, 1893 |
| 548,874 | Hayward | Oct. 29, 1895 |
| 1,481,165 | Wells | Jan. 15, 1924 |
| 2,435,675 | Curtis | Feb. 10, 1948 |
| 2,801,114 | Chapman | July 30, 1957 |